United States Patent [19]
Tinet
[11] 3,914,595
[45] Oct. 21, 1975

[54] OPTICAL DEVICE FOR READING-OUT A TRACK CARRIED BY A MOVING DATA CARRIER

[75] Inventor: Claude Tinet, Paris, France
[73] Assignee: Thomson-CSF, Paris, France

[22] Filed: Feb. 23, 1973
[21] Appl. No.: 335,429

[30] Foreign Application Priority Data
Feb. 29, 1972 France ............................ 72.06886

[52] U.S. Cl. ................ 250/202; 250/557; 250/234
[51] Int. Cl.² ........................................ G05B 1/00
[58] Field of Search..... 250/202, 234, 219 DR, 216, 250/557, 561, 567, 556, 235

[56] References Cited

UNITED STATES PATENTS

| | | | |
|---|---|---|---|
| 2,489,305 | 11/1949 | McLennan | 250/556 |
| 3,018,555 | 1/1962 | Willey et al. | 250/202 X |
| 3,209,152 | 9/1965 | Brouwer | 250/202 |
| 3,448,284 | 6/1969 | Friesecke | 250/235 X |
| 3,473,157 | 10/1969 | Little et al. | 250/202 X |
| 3,528,337 | 9/1970 | Dulebohn | 250/202 X |
| 3,597,619 | 8/1971 | Little | 250/202 |
| 3,609,237 | 9/1971 | Gerber | 250/202 |

*Primary Examiner*—Walter Stolwein
*Attorney, Agent, or Firm*—Cushman, Darby & Cushman

[57] ABSTRACT

The invention relates to optical devices for reading-out data recorded along a track carried by a moving data carrier. The read-out device in accordance with the invention comprises a projection lens for forming an enlarged image of the illuminated track, photoelectric means for reading out and sensing the displacement of said image perpendicularly to the direction of motion of said track, and feedback control means for controlling the position of said projection lens along a direction intersecting said track.

13 Claims, 5 Drawing Figures

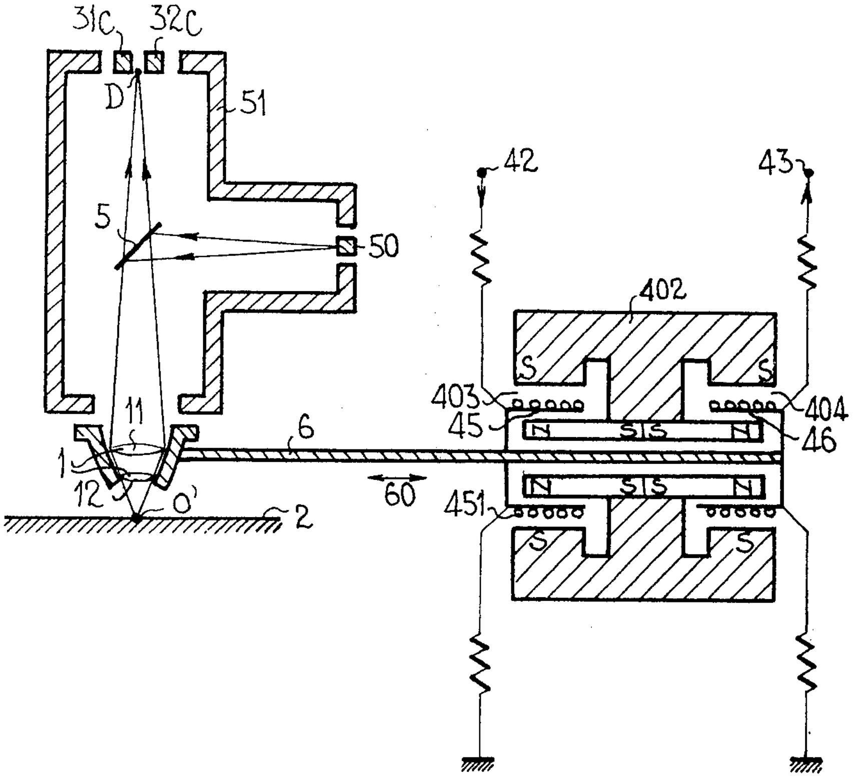
FIG. 4
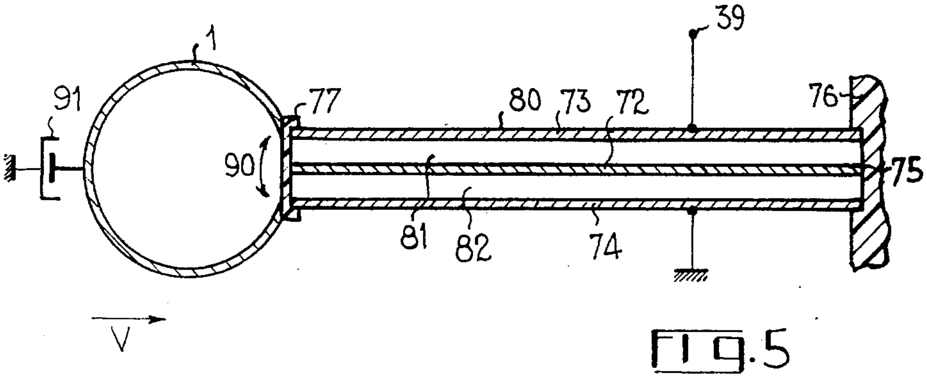

OPTICAL DEVICE FOR READING-OUT A TRACK CARRIED BY A MOVING DATA CARRIER

The present invention relates to optical devices for reading out data recorded along a track positioned on the recorded face of a moving data carrier, for example a disc or tape.

This data carrier has a motion such that a track moves at constant speed past the read-out device, but the movement is inevitably disturbed by external forces and in particular by forces perpendicular to the read-out direction, such forces being due especially to eccentricities in the case of discs or to yawing in the case of linearly running tapes.

Disturbances of this kind imply the existence of a minimum width on the part of each track so that the latter does not leave the field of capture of the read-out device when affected by such disturbances, thus on the one hand avoiding the loss of information and on the other hand interference between information contained in adjacent tracks lying on the recorded face. For a given data carrier, therefore, this means a limitation upon the data storage density.

According to the present invention, there is provided an optical device for reading out a track positioned on the recorded face of a moving data carrier comprising a housing, means for illuminating a portion of said track, optical stigmatic means for projecting onto a detection plane an image of the illuminated portion of said track, photoelectric means fixed to said housing and positioned in said detection plane for sensing the displacement of said image along a first direction crossing the axis of said track, motor means for driving said optical stigmatic means along a second direction; said second direction being parallel to said recorded face and arranged for crossing said axis, and feedback electric means for controlling said motor means in relation to the voltage supplied from said photoelectric means.

For a better understanding of the present invention and to show how the same may be carried into effect, reference will be made to the ensuing description and the attached figures in which:

FIG. 4 illustrates an embodiment of certain of the elements in FIG. 2;

FIG. 5 illustrates another embodiment of part of the device in accordance with the invention.

In all these figures, the same reference have been utilized throughout to mark the same elements.

Figure 1:
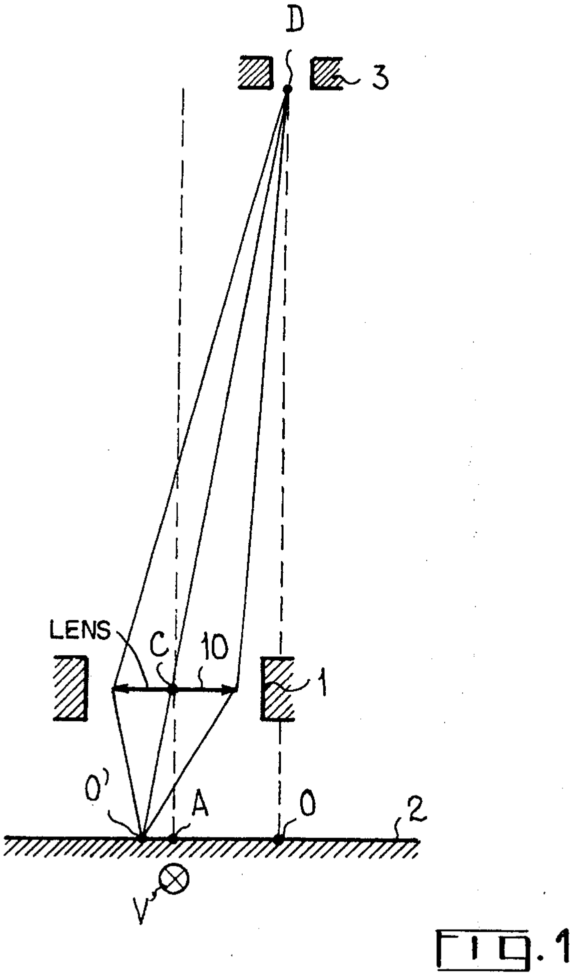
FIG. 1 is a diagram illustrating the principle of the device in accordance with the invention.

In FIG. 1, there can be seen:

a data carrier running at a speed V in the direction perpendicular to the plane of the figure. The lens 1 of the readout device is schematically indicated in the form of a single lens 10 of center C. A detector device 3 is arranged in the image plane of the lens 10 and is designed to receive an optical signal whose time-variation represents the data carried by the recorded face of the data carrier 2. The data carrier 2 carries a track whose direction is perpendicular to the plane of the figure, upon the upper face of which data is recorded in succession, an elementary point area O' of such data being shown.

In this diagram, the case has been illustrated in accordance with which, due to the presence of disturbing forces of the kind hereinbefore described, the track has been transversely shifted in relation to its direction of running, through a distance O'O, the point O being the perpendicular projection of the point D onto the data carrier 2.

When the track is located in the reference position marked by O, the lens 1 is then in a position (not shown) where its centre C is aligned with O and D; the image of O is then formed normally at D.

When the track is in a position such as that represented by O' on the diagram, in order to compensate for this offset, the lens 1 is translated through a distance OA, where A is the perpendicular projection of the centre C of the lens onto the data carrier 2 carrying the track, and the image is then formed at D again, with a field eccentricity O'A which is very small. In other words, it is equal to $O'O/(g+1)$, which value derives directly from a consideration of the similar triangles CO'A and DO'O, $g$ being the magnification DC/O'C of the device; however, the distance OO' is very small and $g$ is in the order of several tens of units. The ratio O'O/OD has moreover been very much exaggerated in the diagram, simply in order to render it easier to appreciate.

The advantage of this kind of value for OA is that it enables a large magnification $g$ to be used, the field of a simple lens becoming smaller and smaller the greater the magnification. Moreover, the control of the track images by translation of the single lens, makes it possible simultanesouly to achieve accurate guidance and rapid response, due to the reduction of the inertia of the moving part of the optical device, which merely comprise the single lens 10.

Figure 2:
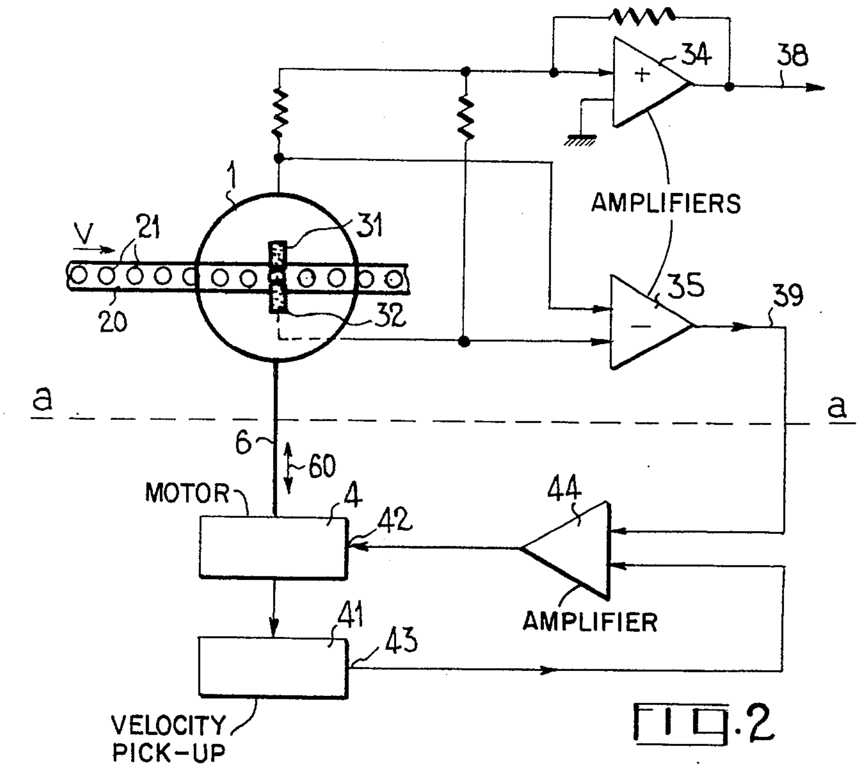
FIG. 2 is a diagram of an embodiment of the read-out device assembly in accordance with the invention.

FIG. 2 illustrates an embodiment of the read-out device assembly in accordance with the invention. In this figure, a track 20 can be seen which runs at a speed B past the lens 1; at either side of the axis of the track 20, there appear the images 31 and 32 of two photosensitive cells referenced $31_c$ and $32_c$, but not shown in this figure, these being formed upon the plane of the track 21 through the lens 1. The lens 1 is mechanically connected, for example by a rod 6, to a motor 4 coupled with a velocity pick-up 41. The electrical part of the device is constituted by:

an inverting amplifier 34 with a negative feedback loop, connected through the medium of resistors to the cells $31_c$ and $32_c$, these connections being schematically illustrated in dotted line to the images 31 and 32 of the figure; the amplifier 34, at its output 38, produces a signal corresponding to the information read from the track 20;

a differential amplifier 35, with two inputs respectively connected at the cells $31_c$ and $32_c$, this supplying at its output 39 a signal, known as the position signal, which indicates the transverse displacement of the track 20 in relation to the axis of symmetry of the two images 31 and 32;

a power amplifier 44, supplied on the one hand with the position signal appearing at the output 39, and on the other with a velocity signal appearing at the output 43 of the velocity pick-up 41. The signal produced by the amplifier 44 is received at a control input 42 of the motor 4.

The motor 4, thus controlled by the position signal, imparts to the lens 1, through the medium of the mechanical linkage 6; a transverse movement which is schematically indicated by the double arrow 60, the effect of this movement being to return the image of the track 20 to position between the detector cells $31_c$ and $32_c$, as shown in FIG. 1. The velocity loop comprising the velocity pick-up 41 connected to the amplifier 44, is designed, as those skilled in the art will appreciate, to increase the stability of the servomechanism described hereinbefore; it can be replaced by a simple mechanical damper.

The track 20 may carry data recorded in the form of optical contrasts;

thus, the zones 21 have a coefficient of reflectivity which differs from that of the remainder of the surface of the track 20, this in the case for example where read-out is effected by reflection of incident light, from the track onto the detector; in the case where read-out is effected by transmission of incident light through the track, to the detector, then it is of course the transparency of the zones 21 of the track which must differ from that of the remainder of the track. It goes without saying, of course, that the various rows of information carried by the data carrier and constituted by sets of zones 21, are separated from one another by zones which have an uniform coefficient of reflectivity (or transparency).

The arrangement of the cells $31_c$ and $32_c$ in such a fashion that their images 31 and 32 are symmetrical in relation to the axis of the track 20, is designed primarily, as stated hereinbefore, to furnish the position signal at the output 39 through the medium of the "difference" channel. Moreover, it makes it possible to obtain at the output 36, the signal corresponding to the data recorded on the track 20, provided that the dimension of the images 31 and 32 of the cells $31_c$ and $32_c$, is smaller than half the interval separating two zones 21, this for obvious reasons of information discrimination.

It is possible to include a low-pass filter in the difference channel, after the amplifier 35, so that only the component frequencies of the signal corresponding to the transverse displacement of the track 20, are transmitted without transmitting the carrier frequency upon which the signal is modulated, the latter carrier frequency generally being very much higher than the said component frequencies.

Figure 3:
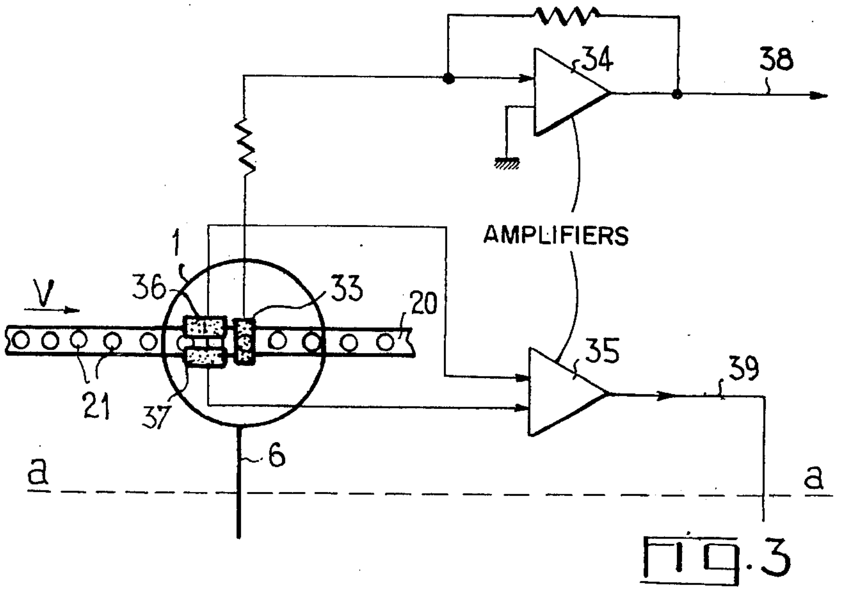
FIG. 3 illustrates a variant embodiment of FIG. 2.

FIG. 3 illustrates a variant embodiment of part of the read-out device in accordance with the invention, as shown in FIG. 2, namely the part situated above a line *aa* and constituted chiefly by the lens 1, the amplifiers 34 and 35, and the images of the detection device.

This embodiment differs from the preceding one in that it comprises three photosensitive cells $36_c$, $37_c$ and $33_c$, the images 36, 37 and 33 of which have been illustrated in the recorded plane of the track 20. The cells $36_c$ and $37_c$ are solely intended to provide, through the medium of the differential amplifier 35, the same position signal as before. The cell 33, with the help of the amplifier 34, produces a signal corresponding to the information read from the track 20.

An arrangement of this kind makes it possible on the one hand to give cells $36_c$ and $37_c$ a larger size:

their images 36 and 37 can then have a larger size than a distance between two zones 21, making it possible to avoid the need for a low-pass filter in the difference channel. On the other hand, it makes it possible to improve the amplitude of the signal obtained at the output 38, because it is possible to cover the whole of the track 20 (in a transverse sense) by the image 33.

FIG. 4 illustrates an embodiment of certain elements of FIG. 2, namely the optical section and the motor of the readout device in accordance with the invention.

The optical section comprises the lens 1, constituted for example by a microscope lens, made up, in the diagram, of two lens elements 12 and 11, and a casing 51 containing a light source 50, a semi-transparent mirror 5 and the two photosensitive cells $31_c$ and $32_c$, so that no parasitic light can enter the system. The light beam emitted by the source 50 is reflected by the mirror 5 and thus illuminates the point O′ on the data carrier 2, at right angles. In this embodiment, read-out is effected by reflection of the beam from the data carrier 2, the image O′ forming at the point D, between the two cells $31_c$ and $32_c$ after the reflected beam has passed the semi-transparent mirror 5.

The motor in this first embodiment, is an eletrodynamic motor of the loudspeaker kind, that is to say has a permanent magnet 401 and a magnetic circuit 402 forming an air gap 403 in which there is arranged a moving coil 45 with windings 451 connected to the control input 42 of the motor.

In operation, when the coil 45, arranged in a permanent field, passes the command signal coming from the amplifier 44 (FIG. 2), it executes a translatory motion corresponding to the direction and strength of the said signal, the latter corresponding to the disturbances in the movement of the track 20, as detected by the cells $31_c$ and $32_c$; this movement, schematically illustrated by the arrow 60, is communicated to the lens 1 through the medium of the rod 6 in order to correct the position of the images of the track, on the cells.

The velocity pick-up 41 of FIG. 2, in this embodiment, takes the form of a second coil 46 mechanically coupled to the first (45) and arranged in an air gap 404 symmetrically disposed vis-a-vis the air gap 403.

In operation, when the coil 45 displaces under the action of the signal received at the input 42, the coil 46, which also displaces, induces a signal proportional to the first derivative of the displacement with respect to time, this signal appearing at the output 43.

FIG. 5 illustrates a variant embodiment of part of the device in accordance with the invention, namely the motor device which moves the lens.

In this figure, there is shown the lens 1, the running speed V of the data beneath the lens, and the motor device in the form of a bimorph transducer arrangement 80, secured at one of its ends to the lens 1 and at the other to a fixed support 76, In order not to overburden the drawing, the true orders of magnitude of these various elements have not been respected.

The device 80 is constituted by two strips 81 and 82, made of a piezoelectric material, that is to say a ceramic having a high piezoelectric factor in a preferred embodiment, the strips being biased in opposite directions, by construction; these strips are arranged in a parallel manner, separated by a conductive layer 72 and covered in each case, on their second face, with another conductive layer, respectively 73 and 74.

The two ends of this device are attached, in the one case, to a lens 1 through the medium of an insulating material, the other end (74) being clamped for example in the support 76 which is likewise an insulator.

The control voltage for displacing the lens, and supplied to the terminal 39 as described hereinbefore (FIG. 2), is applied between the electrodes 73 and 74, which has the effect of moving the lens 1 through a circular arc centered at the clamping point 74, this movement, schematically illustrated by the arrow 90, having an amplitude and direction which are a function of those of the command voltage, and furthermore being substantially equivalent to a linear movement at low amplitudes.

The advantage of this embodiment is that it eliminates all the components conventionally used for the transmission of the motor movement to the lens, and thus eliminates the parasitic coupling and resonance effects which these can introduce; in other words, in the present case, that of the two ends of the bimorph device 80 which is moveable, is directly attached to the lens 1.

It is necessary, however, with this kind of device, to provide a viscous damper, schematically illustrated by an element 91 in the figure and taking the form for example of a vane fixed to the lens 1 and immersed in a viscous liquid.

By way of example, a lens (1) with a focal length in the order of 2 or 3 millimeters and a magnification of 80, has been controlled, at a lateral displacement frequency on the part of a track, not exceeding 25 Hz (taking the case for example of a disc rotating at 1,500 rpm) with the help of a bimorph device 80 being 20 millimeters long, measured from the clamping point, 0.66 mm thick (in the plane of the FIG. 5) and 12 mm high, this device being constituted by two ceramic strips 81 and 82 with a piezoelectric coefficient in the order of 1 $\mu$m/V, the assembly having a free resonance frequency in the order of 200 Hz.

The invention is applicable to discs carrying along their recorded faces tracks on which information is recorded in circular or spiral fashion, and whose centers cannot in practice coincide with the axis of rotation of the drive motor, in particular where interchangeable discs are being used.

The invention is likewise applicable to the read-out of films executing a translational motion, upon which the tracks are arranged in a longitudinal fashion and experience parasitic transverse movements due to inaccuracy of the guidance of the film at the level of the lens.

What I claim is:

1. Optical device for reading out a track positioned on the recorded face of a moving data carrier, said optical device comprising a housing, means for illuminating a portion of said track, optical stigmatic means for projecting onto a detection plane an image of the illuminated portion of said track, photoelectric means fixed to said housing and positioned in said detection plane for sensing the displacement of said image along a first direction crossing the axis of said track, motor means for displacing said optical stigmatic means in relation to said housing along a second direction; said second direction being parallel to said recorded face and arranged for crossing said axis, and feedback electric means for controlling said motor means in relation to the voltage supplied from said photoelectric means; said motor means being mechanically ganged with a velocity sensor; said feedback electric means including a velocity loop fed from said velocity sensor.

2. Optical device as claimed in claim 1, wherein said first ane second directions are both perpendicular to said axis.

3. Optical device as claimed in claim 1, wherein said motor means comprise an electrodynamic motor having a moving coil and means for generating a radial megnetic field around said coil; said velocity sensor comprising a further coil mechanically linked to said moving coil, and means for generating a further radial magnetic field around said further coil.

4. Optical device as claimed in claim 1, wherein said optical stigmatic means cmprise a microscope objective having a magnification substantially greater than unity.

5. Optical device as claimed in claim 1, wherein said photoelectric means comprise two photoelectric cells arranged in said detection plane symmetrically in relation to said image.

6. Optical device as claimed in claim 5, further comprising electrical means for supplying a voltage proportional to the sum of the voltages supplied from said photoelectric cells.

7. Optical device for reading out a track positioned on the recorded face of a moving data carrier, said optical device comprising a housing, means for illuminating a portion of said track, optical stigmatic means for projecting onto a detection plane an image of the illuminated portion of said track, photoelectric means fixed to said housing and positioned in said detection plane for sensing the displacement of said image along a first direction crossing the axis of said track, motor means for displacing said optical stigmatic means in relation to said housing along a second direction; said second direction being parallel to said recorded face and arranged for crossing said axis, and feedback electric means for controlling said motor means in relation to the voltage supplied from said photoelectric means; said motor means driving a viscous damper associated with said optical stigmatic means.

8. Optical device as claimed in claim 7, wherein said first and second directions are both perpendicular to said axis.

9. Optical device as claimed in claim 7, wherein said optical stigmatic means comprise a microscope objective having a magnification substantially greater than unity.

10. Optical device as claimed in claim 7, wherein said photoelectric means comprise two photoelectric cells arranged in said detection plane symmetrically in relation to said image.

11. Optical device as claimed in claim 10, further comprising electrical means for supplying a voltage proportional to the sum of the voltages supplied from said photoelectric cells.

12. Optical device for reading out a track positioned on the recorded face of a moving data carrier, said optical device comprising a housing, means for illuminating a portion of said track, optical stigmatic means for projecting onto a detection plane an image of the illuminated portion of said track, photoelectric means fixed to said housing and positioned in said detection plane for sensing the displacement of said image along a first direction crossing the axis of said track, motor means for displacing said optical stigmatic means in relation to said housing along a second direction; said second direction being parallel to said recorded face and arranged for crossing said axis, and feedback electric means for controlling said motor means in relation to the voltage supplied from said photoelectric means; said motor means comprising a flexural electromechanical transducer of the bimorph plate type; said flexural electromechanical transducer comprising at least two piezoelectric elements having each one end clamped in said housing and said other end fastened to said optical stigmatic means.

13. Optical device for reading out a track positioned on the recorded face of a moving data carrier, said optical device comprising a housing, means for illuminating a portion of said track, optical stigmatic means for projecting onto a detection plane an image of the illuminated portion of said track, photoelectric means fixed to said housing and positioned in said detection plane for sensing the displacement of said image along a first direction crossing the axis of said track, motor means for displacing said optical stigmatic means in relation to said housing along a second direction; said second direction being parallel to said recorded face and arranged for crossing said axis, and feedback electric means for controlling said motor means in relation to the voltage supplied from said photoelectric means; said photoelectric means comprising two photoelectric cells arranged in said detection plane symmetrically in relation to said image; said optical device further comprising a third photoelectric cell arranged in said detection plane; said third photoelectric cell having an elongated receiving face crossing said image.

* * * * *